Dec. 23, 1947. D. W. SIEBERT 2,433,069
RUNNING GEAR FOR BABY CARRIAGES AND THE LIKE
Filed March 18, 1946 2 Sheets-Sheet 1

INVENTOR.
Donald W. Siebert
BY Owen W. Kennedy
Attorney

Dec. 23, 1947.                D. W. SIEBERT                2,433,069
              RUNNING GEAR FOR BABY CARRIAGES AND THE LIKE
                   Filed March 18, 1946           2 Sheets-Sheet 2

INVENTOR.
Donald W. Siebert
BY Owen N. Kennedy
Attorney

Patented Dec. 23, 1947

2,433,069

UNITED STATES PATENT OFFICE 2,433,069

RUNNING GEAR FOR BABY CARRIAGES AND THE LIKE

Donald W. Siebert, Gardner, Mass., assignor to O. W. Siebert Company, Gardner, Mass., a corporation of Massachusetts Application March 18, 1946, Serial No. 655,269

6 Claims. (Cl. 280—47)

The present invention relates to children's vehicles, such as baby carriages, strollers, coaches, and the like, and has for its object to provide an improved running gear for supporting the bodies of such vehicles.

According to the present invention, there is provided a novel construction of the running gear for vehicles of the above noted types, characterized by the fact that the vehicle can be readily steered by exerting light sidewise pressure on the handle, due to an improved mounting of the front wheels with a swivel action. Consequently, the vehicle can be readily turned within its own length, if desired, without the necessity of first tilting the vehicle so as to raise the front wheels clear of the ground, as is usually necessary with the front wheels mounted on a horizontal axis. The frame of the running gear is so constructed as to strongly resist torsional stresses which might otherwise bind the front wheel swivels, while at the same time providing the necessary yieldable support for different types of vehicle bodies. The above and other advantageous features of the invention will hereinafter more fully appear from the following description considered in connection with the accompanying drawings, in which:

Figure 1:
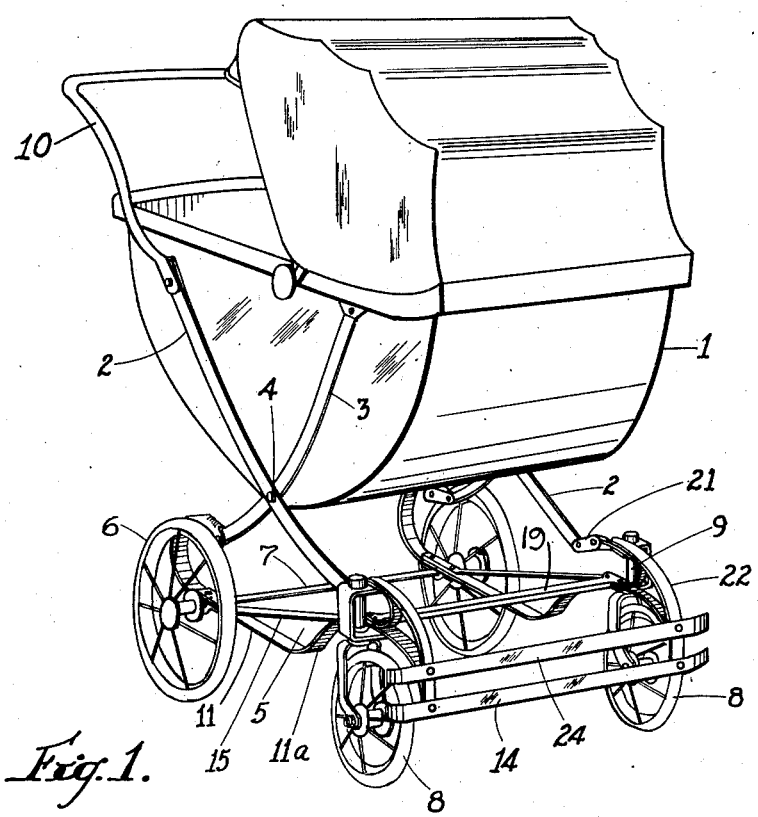
Fig. 1 is a view in perspective of a baby carriage provided with a running gear embodying the invention.

Referring to the drawings, the improved running gear of the present invention is shown for purposes of illustration, as being employed in connection with a baby carriage of the folding type, wherein a body 1 is supported between pairs of crossed side members 2 and 3, which extend below their pivots 4 for connection to the frame 5 of the running gear, which will be hereinafter described in detail. Generally speaking, the running gear provides a pair of rear wheels 6 turnable on a horizontal axle 7 and a pair of front wheels 8 of smaller diameter than the rear wheels 6, with each front wheel turnable on a vertical swivel 9. The body 1 provides a handle connected to the side members 2, so that sidewise pressure applied to the handle 10 will cause the front wheels 8 to quickly turn in either direction about their swivels 9, thereby permitting the carriage to be turned very readily.

Figure 2:
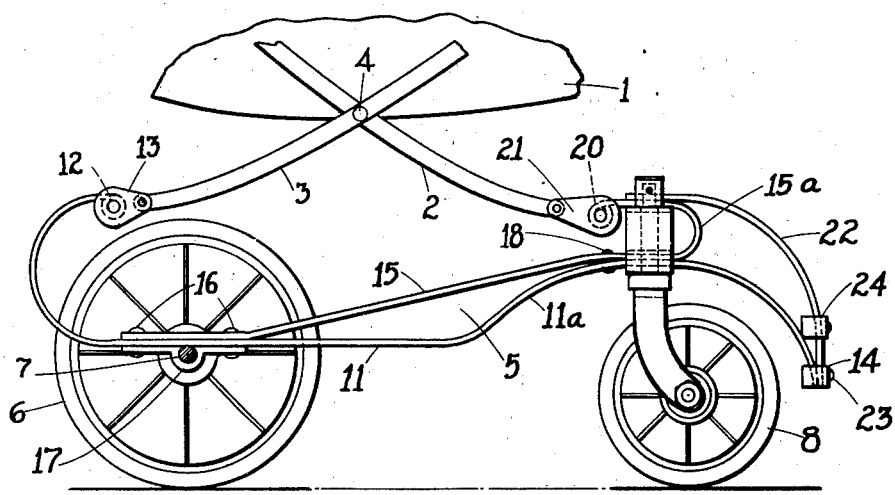
Fig. 2 is a side view of the running gear shown in Fig. 1, with the body and one rear wheel removed.
Figure 3:
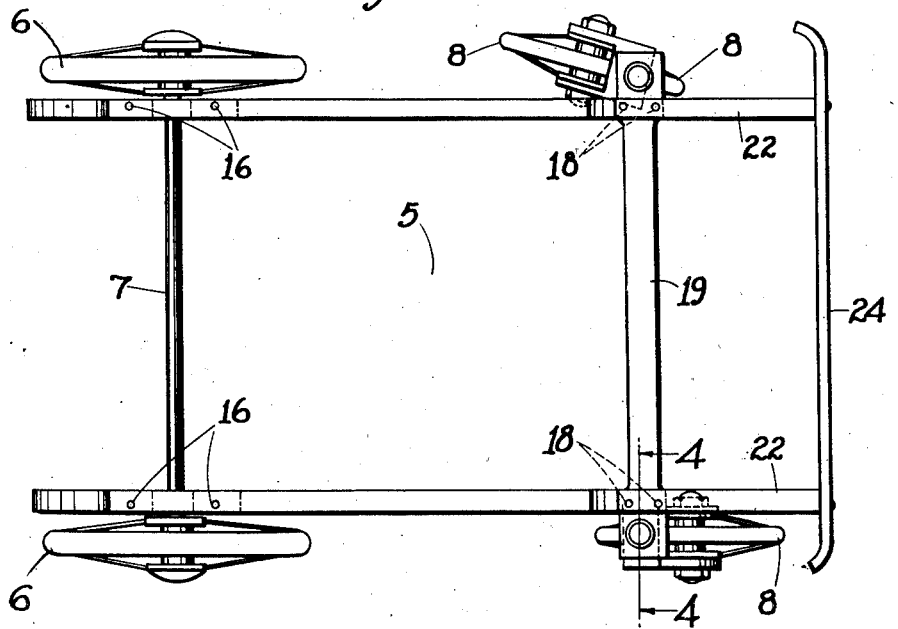
Fig. 3 is a plan view of the parts shown in Fig. 2.

As best shown in Fig. 2, the frame 5 of the running gear consists of a pair of main springs 11 extending longitudinally of the frame, each spring 11 being curved rearwardly above the axle 7 to provide a loop 12 for the pivotal support of a shackle 13 connected to the lower end of each side member 3 of the body. Each spring 11 extends forwardly from the axle 7 to a point beyond the center of the body 1, from where it inclines upwardly at 11a to pass over the front wheels 8. Each spring 11 is bent downwardly beyond its associated wheel 8, where it is connected to the other spring 11 by the cross member 14 of a bumper.

The frame also consists of a pair of auxiliary springs 15 extending parallel to the main springs 11 and each constituting one side of a triangular truss, the other sides of which are the horizontal portion of the main spring 11 and its upwardly inclined portion 11a. The spring members 11 and 15 of each truss are rigidly secured together at the rear end of the frame by rivets 16, which also serve to hold a clip 17 embracing the axle 7 of each side. The springs 11 and 15 of each truss are similarly secured together at the front end of the frame by rivets 18, which also serve to secure the ends of a cross bar 19, so that the two triangular trusses provided by the springs 11 and 15 are held in parallel relation between their points of connection to the axle 7 and to the cross member 19, respectively.

Each spring 15 is bent upwardly and then rearwardly above the cross member 19, as indicated at 15a, and each spring portion 15a provides a loop 20 for the pivotal support of a shackle 21 connected to the lower end of each body side member 2. The reversely bent spring portion 15a is connected to the front end of each main spring 11 by a curved bumper spring 22 extending forwardly and downwardly, with rivets 23 serving to connect the springs 11 and 22 to the cross member 14 of the bumper. In order to further brace the front end of the frame, an additional bumper cross member 24 is connected between the springs 22, so that the entire front end of the frame is extremely well braced to resist torsional stresses tending to distort the frame.

Figure 4:
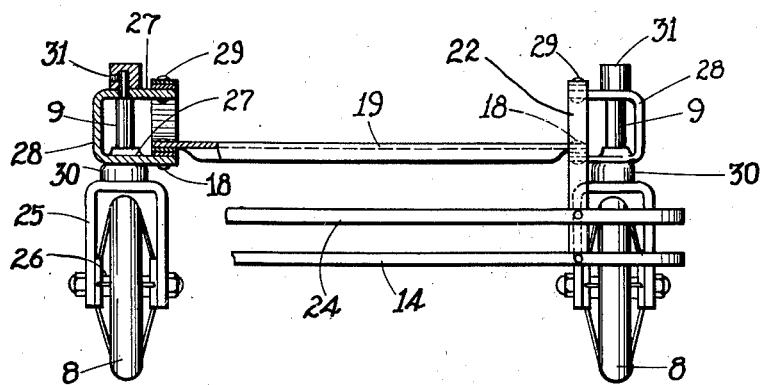
Fig. 4 is a front view of the running gear partly in elevation and partly in section along the line 4—4 of Fig. 3.

As best shown in Fig. 4, the swivel 9 for each front wheel 8 provides a fork 25, between the arms of which the wheel 8 is mounted on an axle 26, and each swivel 9 is mounted for turning about a vertical axis between the arms 27 of a U-shaped bracket 28. The lower arm 27 of each bracket 28 is held by the same rivets 18 which secure the springs 11 and 15 together, while the upper arm 27 is held by the same rivets 29 which secure together the overhanging spring portion 15a and the bumper spring 22. Consequently each swivel 9 is always maintained in a vertical position.

In order to provide for ready turning of each front wheel 8 with its swivel 9, a bushing 30 is interposed between the top of each wheel fork 25 and the lower arm 27 of the associated swivel bracket 28. The assembly represented by each wheel 8, axle 26, fork 25 and swivel 9 is therefore turnable freely about a vertical axis passing through the bracket 28, with a cap 31 serving to hold the swivel at its upper end. Since, as previously pointed out, the arms 27 of each bracket 28 are rigidly connected to the springs 15 and 11 at vertically spaced points of attachment, there is no tendency for the swivels 9 to get out of vertical alinement when using the vehicle.

From the foregoing, it is apparent that by the present invention there is provided an improved running gear for supporting the bodies of children's vehicles, such as baby carriages, strollers, coaches, and the like. While the running gear is shown in Fig. 1 as being employed in connection with a baby carriage of the folding type, wherein the body 1 is supported between crossed side members connected by shackles to the running gear frame, it is obvious that other types of bodies can be directly supported by and connected to the opposed ends of springs 11 and 15, without necessitating any modification in the construction of the running gear.

When using a vehicle provided with a running gear embodying the present invention, it has been found that the rigid construction of the frame resulting from tying together parallel trusses permits the vehicle to be subjected to severe usage without exhibiting any distortion or twist such as would tend to bind the swivels and interfere from free turning. Should the vehicle run into an obstacle with any considerable force, the bumper members 14 and 24 will transmit the force of the collision to the parallel spring trusses in a straight line on either side of the frame, which trusses are connected transversely at four points represented by the rear axle 7, the cross bar 19 and the bumper cross members 14 and 24. Therefore, the swivels 9 will remain in parallel relation and the front wheels 8 will swing freely on the frame under severe service conditions.

I claim:

1. A running gear for children's vehicles, comprising, in combination, a first horizontal cross member having a wheel rotatably mounted upon each of the opposite end portions thereof, a second cross member disposed in spaced and parallel relation with said first member, a pair of truss members each securing a respective one of the end portions of said first member to a corresponding end portion of said second member, each of said truss members comprising a pair of vertically stacked springs secured together adjacent their junctions with said cross members and being bowed apart intermediate said junctions, a pair of bracket members each mounted adjacent a respective one of the end portions of said second cross member, and a wheel mounting having a swivel extending vertically through each of said brackets for supporting wheels of the vehicle for turning independently of each other about parallel vertical axes.

2. A running gear for children's vehicles comprising, in combination, a first horizontal cross member having a wheel rotatably mounted upon each of the opposite end portions thereof, a second cross member disposed in spaced and parallel relation with said first member, a pair of truss members each securing a respective one of the end portions of said first member to a corresponding end portion of said second member, each of said truss members comprising a pair of vertically stacked springs secured together adjacent their junctions with said cross members and being bowed apart intermediate said junctions, a pair of bracket members each mounted adjacent a respective one of the end portions of said second cross member, a wheel mounting having a swivel extending vertically through each of said brackets for supporting wheels of the vehicle for turning independently of each other about parallel vertical axes, a bumper extension integrally formed with each of said truss members and extending beyond said swivel wheels, and a bumper cross piece tying said bumper extensions together.

3. A running gear for children's vehicles comprising, in combination, a rear horizontal axle having a wheel rotatably mounted upon each of the opposite end portions thereof, a front cross member disposed in spaced and parallel relation with said axle, a pair of truss members each securing a respective one of the end portions of said rear axle to a corresponding end portion of said cross member, each of said truss members comprising a pair of vertically stacked springs secured together adjacent their junctions with said axle and said cross member and being bowed apart intermediate said junctions, a rearwardly turned loop member formed integrally with one of said stacked springs of each of said truss members adjacent the cross member, a bracket member rigidly secured to each of said loop members, and a wheel mounting having a swivel extending vertically through each of said brackets for supporting front wheels of the vehicle for turning independently of each other about parallel vertical axes.

4. A running gear for children's vehicles comprising, in combination, a rear horizontal axle having a wheel rotatably mounted upon each of the opposite end portions thereof, a front cross member disposed in spaced and parallel relation with said axle, a pair of truss members each securing a respective one of the end portions of said rear axle to a corresponding end portion of said cross member, each of said truss members comprising a pair of vertically stacked springs secured together adjacent their junctions with said axle and said cross member and being bowed apart intermediate said junctions, a rearwardly turned loop member formed integrally with one of said stacked springs of each of said truss members adjacent said cross member, a bracket member rigidly secured to each of said loop members, a wheel mounting having a swivel extending vertically through each of said brackets for supporting front wheels of the vehicle for turning independently of each other about parallel vertical axes, and a forwardly turned loop member formed integrally with one of said stacked springs of each of said truss members adjacent said rear axle, said vehicle being supported by said running gear at the extreme free end portions of said rearwardly and forwardly turned loops.

5. A running gear for children's vehicles comprising, in combination, a rear horizontal axle having a wheel rotatably mounted upon each of the opposite end portions thereof, a front cross member disposed in spaced and parallel relation with said axle, a pair of truss members each securing a respective one of the end portions of said rear axle to a corresponding end portion of said cross member, each of said truss members comprising a pair of vertically stacked springs secured together adjacent their junctions with said axle and said cross member and being bowed apart intermediate said junctions, a rearwardly turned loop member formed integrally with one of said stacked springs of each of said truss members adjacent said cross member, a bracket member rigidly secured to each of said loop members, a wheel mounting having a swivel extending vertically through each of said brackets for supporting front wheels of the vehicle for turning independently of each other about parallel vertical axes, the other of said springs of each of said truss members extending forwardly over said front wheels to form a bumper extension, and a bumper cross piece tying said bumper extensions together.

6. A running gear for children's vehicles comprising in combination, a rear horizontal axle having a wheel rotatably mounted upon each of the opposite end portions thereof, a front cross member disposed in spaced and parallel relation with said axle, a pair of truss members each securing a respective one of the end portions of said rear axle to a corresponding end portion of said cross member, each of said truss members comprising a pair of vertically stacked springs secured together adjacent their junctions with said axle and said cross member and being bowed apart intermediate said junctions, a rearwardly turned loop member formed integrally with one of said stacked springs of each of said truss members adjacent said cross member, a bracket member rigidly secured between the oppositely opposed portions of each of said loop members, a wheel mounting having a swivel extending vertically through each of said brackets for supporting front wheels of the vehicle for turning independently of each other about parallel vertical axes, the other of said springs of each of said truss members extending forwardly over said front wheels to form a pair of bumper extensions, a bumper cross member tying said extensions together, and a forwardly turned loop member formed integrally with one of said stacked springs of each of said truss members adjacent said rear axle, said vehicle being carried by running gear by being secured to the free end portion of each of said rearwardly and forwardly turned loops.

DONALD W. SIEBERT.

REFERENCES CITED

The following references are of record in the file of this patent:

UNITED STATES PATENTS

| Number | Name | Date |
|---|---|---|
| 642,464 | Lanciaux et al. | Jan. 30, 1900 |
| 1,379,295 | Adams | May 24, 1921 |
| 1,424,345 | Dunkley | Aug. 1, 1922 |
| 2,392,938 | McGregor | Jan. 15, 1946 |

FOREIGN PATENTS

| Number | Country | Date |
|---|---|---|
| 24,678 | Great Britain | June 4, 1914 |
| 243,446 | Great Britain | Nov. 30, 1925 |